United States Patent [19]

Iwasaki et al.

[11] 4,230,762
[45] Oct. 28, 1980

[54] ASPHALT WATER-PROOFING MATERIAL

[75] Inventors: Hajime Iwasaki; Kuninori Mizuta, both of Tokyo; Yoshinori Kobayashi, Iwakuni; Tadayoshi Yoshikawa, Ohtake; Kyouzi Muraoka, Yamaguchi, all of Japan

[73] Assignees: Mitsui Petrochemical Industries Ltd.; Mitsuboshi Sangyo Co., Ltd., both of Tokyo, Japan

[21] Appl. No.: 59,326

[22] Filed: Jul. 20, 1979

[30] Foreign Application Priority Data

Jul. 24, 1978 [JP] Japan .................................. 53-89341

[51] Int. Cl.² ............................................... B32B 5/06
[52] U.S. Cl. .................................... 428/234; 428/235; 428/253; 428/255; 428/287; 428/300; 428/489
[58] Field of Search ............... 428/234, 235, 247, 253, 428/255, 284, 287, 300, 301, 489

[56] References Cited

U.S. PATENT DOCUMENTS 4,035,544   7/1977   Iwasaki et al. ........................ 428/489

Primary Examiner—James J. Bell
Attorney, Agent, or Firm—Cushman, Darby & Cushman

[57] ABSTRACT

An asphalt water-proofing material comprising a core impregnated with petroleum asphalt. The core is made of composite material including a non-woven fabric layer formed of long filaments of synthetic resin arranged in random fashion and a woven or knitted fabric layer. The non-woven fabric and woven or knitted fabric layers are connected together by needle-punching whereby the long filaments of the non-woven fabric layer are forced into the woven or knitted fabric layer to integrally connect these layers to form said core.

10 Claims, 3 Drawing Figures

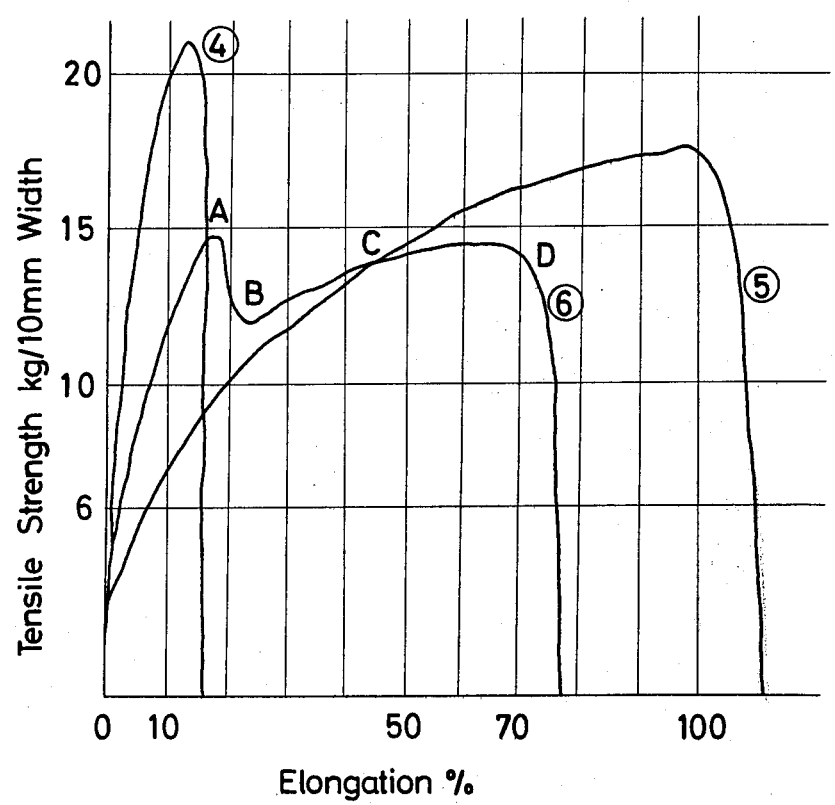
FIG.2 (Longitudinal Direction)

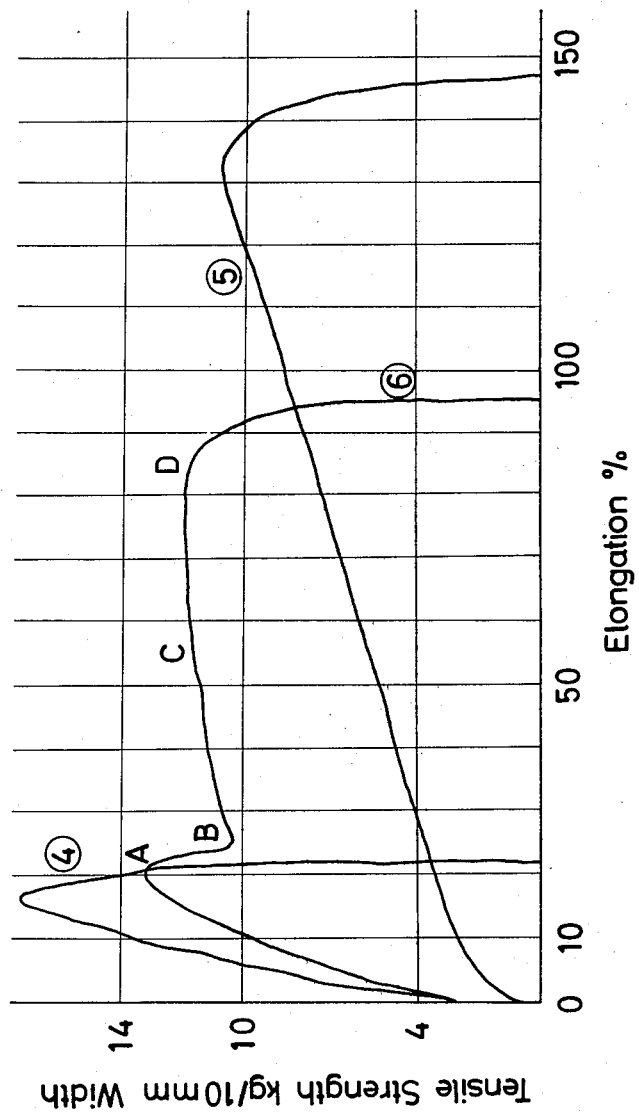
FIG.3 (Lateral Direction)

ASPHALT WATER-PROOFING MATERIAL

BACKGROUND OF THE INVENTION

The present invention relates to an asphalt water-proofing material comprising a core made of composite material including a non-woven fabric and a woven or knitted fabric connected together by needle-punching, said core being impregnated with petroleum asphalt.

There are various types of method for constructing water-proofing structure. The asphalt water-proofing method, among of them, has many advantages over the other methods, such as sheet water-proofing method (which method has a defect in that it tends to produce voids in the connecting area, which cause separation of the water-proofing layer for the substructure or adversely affect the life of the water-proofing property of the water-proofing structure) or method of applying water-proofing material or film on the substructure (which method has such defects that it is difficult to form a water-proofing layer having substantial thickness or uniform thickness), from the reasons that the asphalt water-proofing method provides excellent water-proofing property and also provides high reliability and durability owing to its good quality of material and easy workability and furthermore this method is advantageous from the economical point of view. Accordingly, the asphalt water-proofing method is now widely used, for example, in the field of building construction, to form a water-proofing structure for building roof, wall of kitchen or lavatory or the like, or in the field of earth working, to construct a water-proofing structure for inside or outside wall of underground structure, wall of open-air pool, drainage canal or irrigation canal or the like.

The asphalt water-proofing method includes the steps of successively laying a plurality of asphalt roofing layers upon a substructure to form a water-proofing structure integrally connected by asphalt, and the water-proofing property of this structure basically depends upon the water-tightness of the asphalt. The water-proofing structure made of only asphalt is liable to produce cracks therein owing to drying or shrinkage of the substructure such as concrete slab or the like and such cracks may lead to cause breakage in the asphalt owing to fatigue produced by the repetitive movement at the cracks. The asphalt water-proofing structure has a further disadvantage in that it tends to harden at the lower temperature while it tends to flow at the higher temperature. In order to avoid such disadvantage, it has been proposed to provide a roofing which includes a porous core of reinforcing material such as paper or non-woven fabric made of natural, synthetic, glass or other fibres, said core being impregnated with petroleum asphalt.

A roofing of this kind which includes the paper core is usually prepared by impregnating the core with straight asphalt and then coating said impregnated core with blowing asphalt. This roofing, however, lacks stretching property so that it may easily produce breakage by a slight crack caused in the substructure and a slight relative motion in vertical direction between the cracked portions, and consequently the roofing of this type has very low reliability in its water-proofing function.

Another roofing of this kind, which is called "stretch-roofing", comprises a core made of non-woven fabric in which synthetic filaments are arranged in a layer in random fashion to form a web, to which is applied an adhesive material (usually, emulsion of synthetic resin) such as by spraying to fix the crossing points of the fibres. This roofing has general properties of high tensile strength at the initial stage as well as at the maximum elongation and low stretchability, owing to the fixing of the fibres at their crossing points, as described above, and consequently it has high rigidity and low resistance to crumpling effect and lacks restoring property. Although it has higher adaptability to cracks caused in a substructure than that of an asphalt roofing having paper core, it is low in its fatigue-resistant property and incomplete in its durability as a water-proofing layer.

Another asphalt roofing has been known, which includes a bulky non-woven fabric having substantial thickness, for example 4 mm, which is prepared by applying needle-punching process to a mass of endless filaments of polypropylene thereby interlocking these fibres together (see, U.S. Pat. No. 4,035,544). This asphalt roofing has high tensile strength, such as 15.0 kg/10 mm width or more, and high stretching ratio which is higher than five times of that of the conventional asphalt roofing. Furthermore, it is superior in its crack-resistant and crumpling-resistant properties. Sometimes thinner asphalt roofing may be required, depending on the purpose or mode of using the asphalt roofing. In such a case, if the thickness of the non-woven fabric of the core was decreased (for example, to 1.5 mm thickness), the filaments could not be satisfactorily interlocked together by the needle-punching process alone, so that there remain such disadvantages that the core is liable to cause wrinkles or shrinkages during asphalt impregnating step and the roofing thus produced has low tensile strength although it has high elongation.

SUMMARY OF THE INVENTION

It is an object of the present invention to eliminate the above mentioned disadvantages in the conventional asphalt roofing and to provide an asphalt water-proofing material which is superior in working efficiency, productivity and performance.

To this end, the inventors have made study of the core for the asphalt roofing and invented a novel core in which a non-woven fabric including long filaments arranged in random fashion in the form of a web and a woven or knitted fabric are stacked one upon the other and then these fabrics are subjected to the needle-punching process so that the filament forming said non-woven fabric are forced through the woven or knitted fabric to connect these fabrics together to constitute an integral composite material forming the core.

The non-woven fabric is formed by arranging the long filaments (including continuous filaments) of synthetic resin in random fashion and, preferably, applying pre-needle-punching. The most preferable synthetic resin used for this purpose is polypropylene. Also, polyester may be used.

Polypropylene in this invention means homopolymer of propylene, copolymer of major amount of propylene and minor amount of α-olefin monomer such as ethylene, butene-1, or 4-methyl-1-pentene, and polymer blend of major amount of propylene polymer with minor amount of other olefin polymer. They have high molecular weight to be able to form long filament, and the intrinsic viscosity measured in a decalin solution at 135° C. is 1.0–3.0 (dl/g).

The polyester which forms the non-woven fabric may be prepared by the condensation reaction of one or more of acid components including aromatic dicarboxylic acids or their lower alkyl esters as their principal components and one or more of glycols, and/or the self condensation reaction of one or more of aromatic oxyacids or their lower alkyl esters.

The aromatic dicarboxylic acids may include terephthalic acid, naphthalene-2,6-dicarborylic acid, diphenylethercarboxylic acid, ethylene-1,2-bis(P-carboryphenyloxide), P,P-disulfonyl benzoic acid, etc. and the glycols may include polymethylene glycol having 2–10 carbon atoms and cyclohexanedimethanol. The aromatic oxyacids may include P-($\beta$-oxyethoxy)benzoic acid. The polyester may further includes, as the small amount components thereof, isophthalic acid, phthalic acid, oxalic acid, adipic acid, sebacic acid, 6,6′-disulfonyl caproic acid, diethylene glycol, triethylene glycol, neopentyl glycol, bisphenol A, etc.

Most preferable polyesters, among of them, are polyethylene terephthalate (PET) and polytetramethylene terephthalate (PTMT) and the copolymers including the above mentioned small amount components are also preferable. These polyester must have sufficiently high molecular weight to form long filament, that is, the resins must have intrinsic visocity of 0.4 (dl/g) or more. Preferably the polyethylene terephthalate has the intrinsic viscosity of 0.4–1.1 (dl/g) and the polytetramethylene terephthalate has the intrinsic viscosity of 0.5–1.2 (dl/g). The intrinsic viscosity is measured by tetrachloroethane-phenol solution (blend volume ratio 1:1 ) at 30° C.

When the synthetic resin is melt-spun, the synthetic resin may be blended with thermal stabilizer, antioxidant, pigment, molecular weight regulation agent or the like.

The non-woven fabric is obtained by the process disclosed in, for example, U.S. Pat. Nos. 3,338,992, 3,341,394, 3,402,227, 3,502,763 and British Pat. Nos. 1,198,719 and 1,214,509. The process consists of melt-spinning the synthetic resin, drawing the filament by jetting air against them, and depositing the drawn filaments on a travelling screen conveyor. The long filament has fineness of 0.5–20.0 denier, particularly 3–15 denier, and may be formed at any of various drafting or drawing ratio, but the filament having higher tensile strength and higher elongation percentage is preferable. The non-woven web thus obtained is subjected to the pre-needle-punching at the rate of 10–180 punches/cm$^2$, preferably 30–120 punches/cm$^2$, whereby the filaments are interlocked with each other at a plurality of points therein. When the needle-punching is done, the surface active agent such as polyoxyethylene-alkyl-ether, polyoxyethylene-alkylphenyl-ether or other non-ionic surface active agent, may preferably be sprayed to the surface of non-woven fabrics. Preferably, the non-woven fabric has weight of 80–1000 g/m$^2$, particularly 100–500 g/m$^2$ and thickness of 0.5–4.0 mm, particularly 1.0–3.0 mm.

Another layer of the core is formed by woven or knitted fabric. The woven or knitted fabric is preferably made of yarns of various kinds of hemp including Manila hemp, sisal hemp, jute, flax, ramie. The hemp may be blended with the other fibres such as cotton or polyester fibres.

It is preferable to use hemp yarns having lower elongation, particularly hemp yarns having high tensile strength at the time of 3% elongation. It is most preferable to use a scrim made of No. 5–20 count yarns, particularly No.12–32 count yarns at the density of 12–32 yarns/10 cm. Preferably the scrim has weight of 50–250 g/m$^2$, particularly 80–200 g/m$^2$. A scrim in which yarns are crossed and fixed with each other at the crossing points by means of adhesive material may be used. As the distance between yarns is decreased or the density of fabric is increased, the scrim is liable to break at the time of needle-punching through the non-woven fabric and woven or knitted fabric layers, so that desired strength cannot be obtained, and furthermore, the speed of the molten asphalt permeating into the woven or knitted fabric layer is lowered, so that the asphalt water-proofing material thus obtained tends to cause bending or separation of layers.

The woven or knitted fabric layer may also be made of filaments of polyester such as polyethylene terephthalate, polytetramethylene terephthalate or the like which is used to form the non-woven fabric. Preferably the woven or knitted fabric has small stretching property and high tensile strength at the time of 3% elongation. It is most preferable to use a scrim made of No. 5–50 count yarns, particularly No. 10–30 count yarns at the density of 7–20 yarns/inch, or a scrim made of filaments of 100–800 denier, particularly, 120–500 denier at the density of 3–8 yarns/cm. Preferably, the scrim has weight of 10–100 g/m$^2$, particularly 15–75 g/m$^2$.

The woven or knitted fabric may be made of other materials, such as rayon, polyacrillonitrille, vinylon or the like, and the rayon may include viscose layer, cuprammonium rayon and improved rayon thereof.

The composite material is obtained by stacking the non-woven fabric and woven or knitted fabric layers one upon the other and then applying needle-punching process through the both layers. The composite material is preferably constructed from two layers, non-woven fabric and woven or knitted fabric, or three layers, non-woven fabric/woven or knitted fabric/non-woven fabric. It may be constructed from four or more layers. The needle-punching through the both layers is preferably performed at the rate of 20–100 punches/cm$^2$, particularly at the rate of more than 50 punches/cm$^2$, to obtain the good connection between the both layers. The preferable depth of the needle is 4–20 mm, particularly 10–16 mm. The composite material thus formed has preferable properties as a core material, for example, tensile strength at the time of 3% elongation (ASTM D-1682) of more than 6 kg/10 mm width in the longitudinal direction and more than 4 kg/10 mm width in the lateral direction and stretching ratio of more than 50%.

BRIEF DESCRIPTION OF THE DRAWINGS

FIG. 2 shows the results of tension test of the asphalt water-proofing material in the longitudinal direction, in which the curves (4) and (5) indicate the results concerning the conventional material and the curve (6) indicates the result concerning the material according to the present invention; and FIG. 3 shows the results of tension test of the asphalt water-proofing material in the lateral direction, in which the curves (4) and (5) indicate the results concerning the conventional material and the curve (6) indicates the result concerning the material according to the present invention.

DESCRIPTION OF PREFERRED EMBODIMENT

Figure 1:
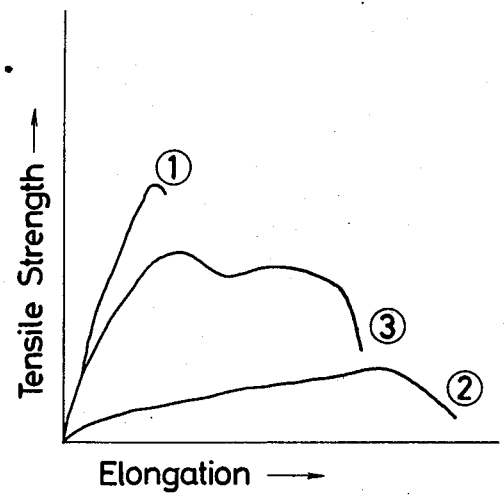
FIG. 1 shows the results of tension test of the core of asphalt water-proofing material, in which the curves (1) and (2) indicate the results concerning the cores of the conventional construction and the curve (3) indicates the result concerning the core made of composite material according to the present invention.

Now the invention will be explained with reference to the drawings.

FIG. 1 shows the tensile strength-elongation curves of the tension test concerning the core of asphalt water-proofing material. Referring to FIG. 1, the curve (1) indicates the property of the non-woven fabric having high rigidity according to the conventional construction in which staple fibres are connected with each other at their crossing points by means of adhesive material. It is clear that the non-woven fabric of this type has high tensile strength and low elongation. The curve (2) indicates the property of the non-woven fabric according to the conventional construction having decreased thickness in which filaments are interlocked with each other by needle-punching process, having weight of about 140 g/m$^2$, for example. It is seen that the non-woven fabric of this type has considerably high elongation and low tensile strength. The curve (3) indicates the property of the core constructed according to the present invention. It is indicated that the core made of composite material according to the present invention has considerably high tensile strength while it retains high elongation obtained in the non-woven fabric prepared by the needle-punching process.

Table I indicates the properties of various types of composite material according to the present invention.

This table indicates that at the initial stage of the stretching the tensile strength of the woven fabric provides the strength of the composite material and after the yarns of the woven fabric have been broken or unbound from each other the filaments of the non-woven fabric become close with each other, while increasing the tensile strength and securing high elongation of the composite material. Such property is a characteristic feature which has not been seen in the conventional core material, and this is a reason why the asphalt water-proofing material using such composite material as its core exhibits superior durability and water-proofing property over the conventional asphalt roofing when a crack is produced in the substructure.

The asphalt water-proofing material is manufactured as a long piece by continuously passing the composite material through the molten petroleum asphalt, which has softening point of 70°–120° C. (ASTM D-2398-7) and penetration of 10–60 at 20° C. (ASTM D-5-73), and then cooling the same.

The petroleum asphalt for impregnating the core includes blowing asphalt, catalytic blowing asphalt and other various types of asphalt and asphalt compositions containing various types of rubber, latex, synthetic resin, aggregates, additives or the like blended with the asphalt.

In the present invention, it is possible to form a water-proofing material by impregnating the composite material with molten petroleum asphalt and then coating one or both sides of the impregnated composite material with same or different kind of asphalt. Such water-proofing material is usually covered by a stripping sheet which can be easily stripped when the water-proofing material is used in the field.

It has been found that the composite material according to the present invention has produced little thermal shrinkage, no wrinkle and no separation of the non-woven fabric layer from the woven fabric layer when it has been dipped in the molten petroleum asphalt, and thus it has proved that the connection of the both layers by means of the needle-punching is very strong and the asphalt water-proofing material can be continuously produced from this composite material. The asphalt water-proofing material thus produced clearly shows the characteristic feature of the composite material as explained above, and it is clear than an asphalt water-proofing material having high tensile strength and considerably high elongation which forms the object of the present invention can be obtained. These characteristic features are shown in FIGS. 2 and 3, in which the ordinate indicates the tensile strength of the asphalt water-proofing material and the abscissa indicates the elongation. FIG. 2 shows the characteristics in the longitudinal direction, while FIG. 3 shows the characteristics in the lateral direction. As indicated in these figures, the strech roofing (4) has high initial tensile strength but it has a defect that it easily cause breakage. The roofing (5) using the needle-punched non-woven fabric as it core exhibits such characteristics that the tensile strength is increased with the increase of the elongation and the elongation is considerably higher than that of the stretch roofing. However, this roofing has a defect in that the initial tensile strength is low and the roofing as a whole is soft and lacks stiffness, so that it becomes softened under the effect of the molten asphalt when it is practically used and tends to produce wrinkles or bending. Accordingly, it cannot be practically used except the case where it is employed in the scale of a laboratory use. Compared with these roofings, the asphalt water-proofing material (6) according to the present invention exhibits such characteristics that when it is subjected to tension test the strength rapidly increases from the start of stretching to the point A, where the yarns of the woven fabric become unbound or partly broken, so that the tensile strength slightly decreases until it comes to the point B. From the point B, the tensile strength is increased again due to the filaments of the non-woven fabric coming close to each other, and the tensile strength is further increased through the point C to the point D, where the interlocking between the filaments of the non-woven fabric is removed, and the tensile strength is decreased until it becomes broken.

Thus it is found that the water-proofing material according to the present invention has high initial tensile strength, which corresponds to that of the commercially available stretch-roofing, and also has high elongation, which corresponds to that of the roofing using the needle-punched non-woven fabric as its core. Such characteristic features are obtained on such principle that the initial tensile strength is increased under the function of the woven fabric in the composite material, while the elongation is considerably increased under the function of the needle-punched non-woven fabric, and thus an ideal water-proofing material which can produce a durable and reliable water-proofing structure is obtained.

Table II shows the properties of the asphalt water-proofing material.

Now the various tests and test results will be explained. In an asphalt water-proofing structure, in general, a water leakage occurs when the substructure such as concrete slab becomes cracked and the asphalt roofing thereon, which has little streching property, cannot follow the crack in the substructure and thus it becomes broken. Also the asphalt roofing is broken when a small crack is produced in the slab surface and the width of the crack becomes increased or decreased under the effect of atmospheric temperature or motion of the building, that would apply crumpling effect upon the asphalt roofing and accumulate fatigue therein. In order to reproduce such effect in a laboratory, we conducted repetitive vertical shearing test and breaking test according to the steps as hereinafter described.

A testing machine including a fixed plate and a movable plate movable in vertical direction and arranged in contacting relationship with said fixed plate was used. A test piece of the asphalt water-proofing material was put on these plates. The test piece was fixed on these plates by means of supporting members at the distances of 10 mm to the left and right, respectively, from the contacting central portion. Then the movable plate was moved, with 5 mm upward and 5 mm downward, total 10 mm, in 1 sec., so that crumpling fatigue effect was applied to the test piece. The vertical shearing test was stopped after predetermined times measured by an automatic counter, and then the water passing test was conducted at a predetermined pressure for ten minutes, to observe the passing of water through the roofing. In the breaking test, the same testing machine was employed. In this test, however, the movable plate was not moved in vertical direction but moved in horizontal direction at a predetermined speed (5 mm/min.), to observe the occurrence of breakage of the test piece. When a crack of a predetermined width was observed, the test piece was removed and subjected to the water passing test at a predetermined pressure for 10 minutes, to observe the passing of water.

The asphalt water-proofing material according to the present invention is prepared by arranging a non-woven fabric having long filaments interlocked with each other and a woven or knitted fabric one upon the other and applying needle-punching thereto to integrally connect the non-woven fabric layer and the woven or knitted fabric layer to form a composite material having special properties and characteristic features, and then impregnating and saturating such composite material with molten petroleum asphalt. The composite material which forms the core of the asphalt water-proofing material has high initial tensile strength, so that the occurrence of wrinkle and shrinkage at the time of impregnation is prevented and the dipping and impregnating step is performed easily and effectively. Thus the deformation or shrinkage of the material at the time of actual application thereof can be avoided. This material can be used, with various asphalts, in any single or combined form, or it can be used, with different asphalts being applied onto front and rear surfaces, respectively. The asphalt for impregnating the core may be varied, depending upon the material of the composite core or the use of the asphalt water-proofing material. That is, any of blowing asphalt, catalytic blowing asphalt, rubberized asphalt, improved asphalt containing synthetic resin and the like may be used. It is also possible to coat the impregnated composite material with same or different asphalt on its one or both sides, to form an asphalt water-proofing material. By varying the construction of the composite material or selecting the kind of asphalt, it is possible to provide an asphalt water-proofing material which is most suitable to the particular purpose, location or circumstances where the water-proofing material is applied. Thus the present invention provides great advantages, in the field of building construction or earth working, for example, to construct building roof, water-tight wall of chamber, water-proofing structure for underground construction, wall of open-air pool, fishpond, drainage cannal, irrigation cannal or shore protection or the like.

Some results of the tests conducted on the asphalt water-proofing materials having core materials as shown in Table I are shown in the following examples.

EXAMPLE 1

A non-woven fabric (thickness: 1.3–1.5 mm, needle-punch:45 punches/cm$^2$, needle depth: 10 mm) made of long filaments (8 denier) of polypropylene and a woven fabric made of warps of No. 10 count hemp yarn and wefts of No. 11 count hemp yarn, with the density of 21 warps per 10 cm and 17 wefts per 10 cm were put one upon the other and non-ionic surface active agent was applied to the side of the non-woven fabric by spraying at the rate of 1 g/m$^2$. The needle-punching was applied through both fabrics at the rate of 50 punches/cm$^2$ and with the depth of 15 mm to form a composite material. The composite material was dipped into the molten compound asphalt (softening point: 102° C., penetration at 25° C.: 32) at the temperature of 145° C. for 60 seconds, and then cooled to form an asphalt water-proofing material having thickness of 1.8 mm. The shrinkage was less than 2%. The other properties are shown in Table II-(1).

EXAMPLE 2

The material shown in Table I-(1) was used to form a composite material same as that shown in Example 1. The composite material was dipped in the molten rubberized asphalt (softening point: 96° C., penetration at 25° C.: 38) at the temperature of 145° C. for 60 seconds. Then it was cooled to form an asphalt water-proofing material having thickness of 2.0 mm. The shrinkage was less than 2%. The other properties are shown in Table II-(1).

Substantially same result was obtained, when blowing asphalt having softening point of 100° C. and penetration of 35° at 25° C. was used.

EXAMPLES 3–6

The materials shown in Table I-(1) were used to form composite materials same as that shown in Example 1, the composite materials were impregnated with the asphalt shown in Example 2 to form asphalt water-proofing materials. The shrinkage of these materials was less than 2%, the other properties are shown in Table II.

COMPARATIVE EXAMPLE 1

Only the non-woven fabric used in the above Examples 1–6 was used as a core and an asphalt water-proofing material was prepared under same conditions as those described in Example 1. The properties are shown in Table I-(1).

EXAMPLE 7

A non-woven fabric (thickness: 1.3–1.5 mm, needle-punching: 45 punches/cm$^2$, needle depth: 10 mm) made of long filaments (5 denier) of polyethylene terephthalate ($[\eta]=0.68$) and a woven fabric including warps and wefts both made of polyethylene terephthalate filaments of 250 denier with the density of 3 filaments/cm were put one upon the other and non-ionic surface active agent was applied to the side of the non-woven fabric by spraying at the rate of 1 g/m². The needle-punching was applied through both fabrics at the rate of 100 punches/cm² and with the depth of 14 mm to form a composite material. The composite material was dipped into the molten compound asphalt (softening point: 102° C., penetration at 25° C.: 32) at the temperature of 190° C. for 60 seconds, and then cooled to form an asphalt water-proofing material having thickness of 1.6 mm. The shrinkage was less than 5%. The other properties are shown in Table II-(2).

EXAMPLES 8-12

Composite materials were prepared from the materials shown in Table I-(2) under the same conditions as those shown in Example 7, and then they were impregnated with asphalt shown in Example 7 to produce asphalt water-proofing materials. The shrinkage in each case was less than 5%. The other properties are shown in Table II-(2).

COMPARATIVE EXAMPLES 2-3

The asphalt water-proofing materials were prepared, using only the non-woven fabric used in the above Examples 7-12 as the core, under the same conditions as those of Example 7. The properties are shown in Table II-(2).

EXAMPLES 13-20

These examples show the results of the tests conducted on the materials shown in Table I-(3) and Table I-(4). The results are shown in table II-(3) and Table II-(4).

TABLE I - (1)

| | Core (Composite Material) | | | | | | | | | |
|---|---|---|---|---|---|---|---|---|---|---|
| | Material | | Weight (g/m²) | | Strength at 3% Elongation (kg/10mm) | | Tensile Strength (kg/50mm) | | Elongation (%) | |
| Example | Non-Woven Fabric | Woven Fabric | Non-Woven Fabric | Woven Fabric | Long. | Lat. | Long. | Lat. | Long. | Lat. |
| 1 | PP | Jute ($\frac{10s \times 11s}{21 \times 17/10cm}$) | 140 | 140 | 9.1 | 3.9 | 48.7 | 17.8 | 90 | 110 |
| 2 | PP | Jute ($\frac{10s \times 11s}{19 \times 17/10cm}$) | 130 | 135 | 8.0 | 3.5 | 41.3 | 16.5 | 100 | 125 |
| 3 | PP | Jute ($\frac{10s \times 11s}{19 \times 17/10cm}$) | 140 | 135 | 8.1 | 3.5 | 41.0 | 16.7 | 101 | 120 |
| 4 | PP | Jute ($\frac{10s \times 10s}{15 \times 15/10cm}$) | 130 | 110 | 7.2 | 3.2 | 30.5 | 16.8 | 105 | 123 |
| 5 | PP | Jute ($\frac{10s \times 10s}{15 \times 15/10cm}$) | 140 | 110 | 7.5 | 3.3 | 31.8 | 16.0 | 109 | 130 |
| 6 | PP | Jute ($\frac{10s \times 11s}{30 \times 20/10cm}$) | 140 | 180 | 10.0 | 4.0 | 56.3 | 23.0 | 93 | 112 |
| Comparative 1 | PP | — | 140 | — | <0.5 | <0.5 | 31.0 | 16.9 | 123 | 135 |

PP = Polypropylene

TABLE I - (2)

| | Core (Composite Material) | | | | | | | | | |
|---|---|---|---|---|---|---|---|---|---|---|
| | Material | | Weight (g/m²) | | Strength at 3% Elongation (kg/10mm) | | Tensile Strength (kg/50mm) | | Elongation (%) | |
| Example | Non-Woven Fabric | Woven Fabric | Non-Woven Fabric | Woven Fabric | Long. | Lat. | Long. | Lat. | Long. | Lat. |
| 7 | PET | PET ($\frac{250d \times 250d}{3 \times 3/cm}$) | 140 | 25 | 6.3 | 4.2 | 48.1 | 43.1 | 80 | 110 |
| 8 | PET | PET ($\frac{10s \times 10s}{10 \times 10/inch}$) | 160 | 125 | 7.6 | 6.8 | 58.0 | 50.0 | 76 | 81 |
| 9 | PTMT | PET ($\frac{10s \times 10s}{10 \times 10/inch}$) | 140 | 40 | 7.6 | 6.8 | 48.6 | 41.9 | 112 | 101 |
| 10 | PTMT | PET ($\frac{250d \times 250d}{3 \times 3/cm}$) | 140 | 25 | 6.3 | 4.2 | 43.8 | 41.5 | 93 | 125 |
| 11 | PET | Rayon ($\frac{20s \times 20s}{16 \times 15/inch}$) | 160 | 50 | 6.2 | 4.8 | 45.1 | 38.2 | 58 | 61 |
| 12 | PTMT | Rayon ($\frac{20s \times 20s}{16 \times 15/inch}$) | 160 | 50 | 6.2 | 4.8 | 40.5 | 37.9 | 83 | 60 |
| Comparative 2 | PET | — | 170 | — | <0.5 | <0.5 | 39.7 | 30.1 | 75 | 98 |
| Comparative 3 | PTMT | — | 160 | — | <0.5 | <0.5 | 21.8 | 27.4 | 84 | 129 |

PET = Polyethylene Terephthalate
PTMT = Polytetramethylene Terephthalate

TABLE I - (3)

| | Material | | Core (Composite Material) | | | | | | | |
|---|---|---|---|---|---|---|---|---|---|---|
| | | | Weight (g/m²) | | Strength at 3% Elongation (kg/10mm) | | Tensile Strength (kg/50mm) | | Elongation (%) | |
| Example | Non-Woven Fabric | Woven Fabric | Non-Woven Fabric | Woven Fabric | Long. | Lat. | Long. | Lat. | Long. | Lat. |
| 13 | PET | Jute ($\frac{10s \times 11s}{21 \times 17/10cm}$) | 140 | 140 | 9.2 | 4.1 | 53.7 | 42.5 | 80 | 100 |
| 14 | PET | Jute ($\frac{10s \times 11s}{19 \times 17/cm}$) | 160 | 135 | 8.5 | 3.7 | 60.1 | 49.5 | 75 | 90 |
| 15 | PET | Jute ($\frac{10s \times 11s}{19 \times 17/cm}$) | 140 | 135 | 8.1 | 3.6 | 51.0 | 43.0 | 80 | 100 |
| 16 | PET | Jute ($\frac{10s \times 10s}{15 \times 15/10cm}$) | 160 | 110 | 7.2 | 3.3 | 61.3 | 48.0 | 90 | 110 |
| 17 | PET | Jute ($\frac{10s \times 10s}{15 \times 15/10cm}$) | 140 | 110 | 7.5 | 3.3 | 50.0 | 42.1 | 90 | 110 |
| 18 | PET | Jute ($\frac{10s \times 11s}{30 \times 20/10cm}$) | 140 | 180 | 10.8 | 4.5 | 55.0 | 45.5 | 70 | 85 |
| Comparative 4 | PET | — | 170 | — | <0.5 | <0.5 | 39.7 | 30.1 | 75 | 98 |

TABLE I - (4)

| | Material | | Core (Composite Material) | | | | | | | |
|---|---|---|---|---|---|---|---|---|---|---|
| | | | Weight (g/m²) | | Strength at 3% Elongation (kg/10mm) | | Tensile Strength (kg/50mm) | | Elongation (%) | |
| Example | Non-Woven Fabric | Woven Fabric | Non-Woven Fabric | Woven Fabric | Long. | Lat. | Long. | Lat. | Long. | Lat. |
| 19 | PP | PET ($\frac{250d \times 250d}{3 \times 3/cm}$) | 140 | 25 | 6.2 | 4.3 | 47.7 | 17.2 | 80 | 100 |
| 20 | PP | PET ($\frac{10s \times 10s}{10 \times 10/inch}$) | 140 | 125 | 7.2 | 6.0 | 48.0 | 15.2 | 75 | 85 |
| Comparative 5 | PP | — | 140 | — | <0.5 | <0.5 | 31.0 | 16.9 | 123 | 135 |

TABLE II - (1)

| | | | | Properties of Asphalt Water-Proofing Material | | | | | | | |
|---|---|---|---|---|---|---|---|---|---|---|---|
| | | | | Asphalt Water-Proofing Material | | | | | | | |
| | Amount of Impregnation (g/m³) | Strength at 3% Elongation (kg/10mm) | | Tensile Strength (kg/10 mm) | | Elongation (%) | | Water Passing Test (10kg/cm³ 10 min.) after Breaking Test (10mm) | | Water Passing Test (10kg/cm³ 10 min.) after Repetitive Vertical Shearing Test (3600 times) | |
| Example | | Long. | Lat. | Long. | Lat. | Long. | Lat. | Long. | Lat. | Long. | Lat. | Remarks |
| 1 | 2200 | 10.7 | 4.3 | 17.1 | 14.1 | 73 | 65 | 0 | 0 | 0 | 0 | |
| 2 | 2000 | 11.8 | 3.8 | 13.9 | 10.7 | 91 | 81 | 0 | 0 | 0 | 0 | |
| 3 | 2100 | 9.2 | 4.6 | 14.2 | 11.5 | 102 | 111 | 0 | 0 | 0 | 0 | |
| 4 | 2000 | 10.9 | 4.1 | 11.8 | 10.1 | 100 | 83 | 0 | 0 | 0 | 0 | |
| 5 | 2100 | 10.8 | 4.0 | 13.0 | 11.0 | 98 | 100 | 0 | 0 | 0 | 0 | |
| 6 | 2200 | 12.0 | 7.2 | 15.8 | 10.4 | 85 | 110 | 0 | 0 | 0 | 0 | |
| Comparative 1 | 1800 | 3.0 | 2.1 | 14.5 | 12.0 | 120 | 130 | 0 | 0 | 0 | 0 | Lacks Strength at the 3% Elongation |

0 = no water passing

TABLE II (2)

| | | | | Asphalt Water-Proofing Material | | | | | | | |
|---|---|---|---|---|---|---|---|---|---|---|---|
| | Amount of Impregnation (g/m³) | Strength at 3% Elongation (kg/10mm) | | Tensile Strength (kg/10mm) | | Elongation (%) | | Water Passing Test (10kg/cm³ 10 min.) after Breaking Test (10 mm) | | Water Passing Test (10kg/cm³ 10 min.) after Repetitive Vertical Shearing Test (3600 times) | |
| Example | | Long. | Lat. | Long. | Lat. | Long. | Lat. | Long. | Lat. | Long. | Lat. | REmarks |
| 7 | 1600 | 7.7 | 4.9 | 19.3 | 14.9 | 68 | 92 | 0 | 0 | 0 | 0 | |
| 8 | 1800 | 8.6 | 5.8 | 22.3 | 15.2 | 58 | 66 | 0 | 0 | 0 | 0 | |
| 9 | 1800 | 7.2 | 5.1 | 17.5 | 14.0 | 54 | 70 | 0 | 0 | 0 | 0 | |
| 10 | 1600 | 6.7 | 4.2 | 15.3 | 12.1 | 80 | 70 | 0 | 0 | 0 | 0 | |
| 11 | 2000 | 6.5 | 4.5 | 14.9 | 10.7 | 93 | 80 | 0 | 0 | 0 | 0 | |
| 12 | 2000 | 6.5 | 4.3 | 13.2 | 10.8 | 115 | 96 | 0 | 0 | 0 | 0 | |
| Compa- | | | | | | | | | | | | Lacks |

TABLE II (2)-continued

Asphalt Water-Proofing Material

| Example | Amount of Impregnation (g/m³) | Strength at 3% Elongation (kg/10mm) Long. | Lat. | Tensile Strength (kg/10mm) Long. | Lat. | Elongation (%) Long. | Lat. | Water Passing Test (10kg/cm³ 10 min.) after Breaking Test (10 mm) Long. | Lat. | Water Passing Test (10kg/cm³ 10 min.) after Repetitive Vertical Shearing Test (3600 times) Long. | Lat. | Remarks |
|---|---|---|---|---|---|---|---|---|---|---|---|---|
| Comparative 2 | 1500 | 3.8 | 2.3 | 17.9 | 13.7 | 108 | 128 | 0 | 0 | 0 | 0 | Strength at the 3% Elongation |
| 3 | 1500 | 2.9 | 2.0 | 15.8 | 11.5 | 157 | 139 | 0 | 0 | 0 | 0 | |

TABLE II - (3)

Asphalt Water-Proofing Material

| Example | Amount of Impregnation (g/m³) | Strength at 3% Elongation (kg/10mm) Long. | Lat. | Tensile Strength (kg/10mm) Long. | Lat. | Elongation (%) Long. | Lat. | Water Passing Test (10kg/cm³ 10 min.) after Breaking Test (10mm) Long. | Lat. | Water Passing Test (10kg/cm³ 10 min.) after Repetitive Vertical Shearing Test (3600 times) Long. | Lat. | Remarks |
|---|---|---|---|---|---|---|---|---|---|---|---|---|
| 13 | 2200 | 10.9 | 4.5 | 19.1 | 15.2 | 70 | 60 | 0 | 0 | 0 | 0 | |
| 14 | 2400 | 11.5 | 4.2 | 23.0 | 16.2 | 80 | 80 | 0 | 0 | 0 | 0 | |
| 15 | 2100 | 9.8 | 4.2 | 18.5 | 15.5 | 100 | 90 | 0 | 0 | 0 | 0 | |
| 16 | 2400 | 10.8 | 4.1 | 22.8 | 16.8 | 100 | 100 | 0 | 0 | 0 | 0 | |
| 17 | 2100 | 10.6 | 4.0 | 18.9 | 15.9 | 90 | 90 | 0 | 0 | 0 | 0 | |
| 18 | 2200 | 12.5 | 7.5 | 19.8 | 15.5 | 80 | 75 | 0 | 0 | 0 | 0 | |
| Comparative 4 | 1500 | 3.8 | 2.3 | 17.9 | 13.7 | 108 | 128 | 0 | 0 | 0 | 0 | Lacks Strength at the 3% Elongation |

TABLE II - (4)

Asphalt Water-Proofing Material

| Example | Amount of Impregnation (g/m³) | Strength at 3% Elongation (kg/10mm) Long. | Lat. | Tensile Strength (kg/10mm) Long. | Lat. | Elongation (%) Long. | Lat. | Water Passing Test (10kg/cm³ 10 min.) after Breaking Test (10mm) Long. | Lat. | Water Passing Test after Repetitive Vertical Shearing Test (3600 times) Long. | Lat. | Remarks |
|---|---|---|---|---|---|---|---|---|---|---|---|---|
| 19 | 1800 | 6.0 | 4.0 | 15.4 | 12.0 | 85 | 65 | 0 | 0 | 0 | 0 | |
| 20 | 1800 | 6.3 | 4.3 | 15.4 | 12.5 | 90 | 65 | 0 | 0 | 0 | 0 | |
| Comparative 5 | 1800 | 3.0 | 2.1 | 14.5 | 12.0 | 120 | 130 | 0 | 0 | 0 | 0 | Lacks Strength at 3% Elongation |

What is claimed is:

1. An asphalt water-proofing material comprising a composite material including a non-woven fabric layer made of long filaments of synthetic resin arranged in random fashion and a woven or knitted fabric layer, said layers being connected together by needle-punching to form the integral composite material, and a petroleum asphalt saturating said composite material, said petroleum asphalt having softening point of 70°–120° C. and penetration of 10–60 at 25° C., said composite material and/or asphalt water-proofing material having tensile strength of at least 6 kg/10 mm width in longitudinal direction and at least 4 kg/10 mm width in lateral direction at the time of 3% elongation thereof and elongation of at least 50%, thereby providing superior crumpling-resistant, shrinkage-resistant, restoring, crack-resistant or other fatigue-resistant properties.

2. An asphalt water-proofing material according to claim 1, in which said non-woven fabric is made of long filaments of polypropylene, polyethylene terephthalate or polytetramethylene terephthalate.

3. An asphalt water-proofing material according to claim 1, in which said woven or knitted fabric is made of hemp, polyethylene terephthalate or viscose rayon yarns.

4. An asphalt water-proofing material according to any of claims 1 to 3 in which the non-woven fabric layer is made of long filaments of polypropylene and the woven or knitted fabric layer is made of hemp yarns.

5. An asphalt water-proofing material according to any of claims 1 to 3, in which the non-woven fabric layer is made of long filaments of polyethylene terephthalate and the woven or knitted fabric layer is made of polyethylene terephthalate yarns.

6. An asphalt water-proofing material according to claim 4, in which the non-woven fabric layer has weight of 100–500 g/m² and the woven or knitted hemp yarn fabric layer has weight of 80–200 g/m².

7. An asphalt water-proofing material according to claim 4, in which the woven or knitted fabric layer is a scrim made of No. 5–20 count hamp yarns woven at the density of 12–32 filaments/10 cm.

8. An asphalt water-proofing material according to claim 5, in which the non-woven fabric layer has weight of 100–500 g/m² and the woven or knitted fabric layer has weight of 15–75 g/m².

9. An asphalt water-proofing material according to claim 5, in which the woven or knitted fabric layer is a scrim made of No. 10-30 count yarns woven at the density of 7-20/inch or a scrim made of 120-150 denier filaments woven at the density of 3-8 filaments/cm.

10. An asphalt water-proofing material according to claim 1, in which said petroleum asphalt includes blowing asphalt, compound asphalt, catalytic blowing asphalt, rubberized asphalt or resin-blended asphalt.

* * * * *